United States Patent [19]
Pawlowski

[11] Patent Number: 5,633,634
[45] Date of Patent: May 27, 1997

[54] DATA RATE CONVERSION CIRCUIT

[75] Inventor: Christopher A. Pawlowski, Phoenix, Ariz.

[73] Assignee: AG Communication Systems Corporation, Phoenix, Ariz.

[21] Appl. No.: 536,299

[22] Filed: Sep. 29, 1995

[51] Int. Cl.$^6$ .................................................. H03M 1/00
[52] U.S. Cl. ........................................................ 341/61
[58] Field of Search ................................ 341/61, 51, 77, 341/143

[56] References Cited

U.S. PATENT DOCUMENTS

| | | | |
|---|---|---|---|
| 5,019,816 | 5/1991 | Hosono | 341/77 |
| 5,488,593 | 1/1996 | Furumiya et al. | 369/32 |

*Primary Examiner*—Brian K. Young
*Attorney, Agent, or Firm*—Gregory G. Hendricks

[57] ABSTRACT

A data conversion circuit that acts as an interface between components or systems having different data input/output rate requirements. A circuit reads data transmitted at one bit rate and transmits data consisting of the input data along with overhead data interleaved with the input data in a fixed pattern at a faster bit rate. Also disclosed is a circuit that operates to read data at a faster bit rate and transmit data consisting of the input data stripped of interleaved overhead data at a slower bit rate. Data is written into and read from a register array that allows data to be concurrently and independently written and read. A suitable delay is introduced on the output side in order to avoid read/write collisions in the register array and achieve a minimum transmission delay.

16 Claims, 13 Drawing Sheets

DATA RATE CONVERSION CIRCUIT

FIELD OF THE INVENTION

The present invention relates to data transmission systems and more particularly to a circuit that receives data at one rate and transmits the data at a different rate.

BACKGROUND OF THE INVENTION

A data conversion circuit acts as an interface between components or systems having different data input/output bit rates and/or different data format requirements. The typical design for a data conversion circuit requires two buffers. A data frame is written into an input buffer, the data is transferred to the output buffer while at the same time performing any required reformatting, and the data is read from the output buffer and transmitted from the circuit. If the formatting relationship between the input data and the output data is known at the time the input data is received, the design can be reduced to one buffer. Typically, an input data frame and an output data frame are received and transmitted, respectively, over time intervals of equal duration. If data is added or stripped from the input frame as part of the reformatting process and results in a net change in the number of bits to be transmitted, the transmission bit rate will have to change in order to maintain equivalent input and output data frame receive and transmit time intervals.

The full frame buffering design, either single buffer or double buffer, suffers from two main deficiencies. The first is absolute delay through the circuit. The standard implementation introduces a delay that is approximately equivalent to one frame of data. Since there are typically restrictions on the total amount of delay permitted through data transmission systems, a delay of this magnitude can be critical depending upon the system constraints. The second drawback of the frame buffering solution is the size of the implementation. A minimum of the one output frame of storage is required. While this RAM size is usually manageable, a goal is to minimize the gate count in a circuit.

Accordingly, a primary object of the present invention is to minimize the delay between when data is received by the circuit and when the data is transmitted. Another object of the invention is to minimize the buffer storage requirements. Another object of the invention is to incorporate design features and safety margins that allow flexibility in aspects of circuit timing.

SUMMARY OF THE INVENTION

The present invention is a data rate conversion circuit that, in a first demultiplexing mode, accepts an input data stream transmitted at one bit rate and transmits an output data stream consisting of the input data along with overhead, or "stuffed," data of a fixed pattern at a faster bit rate. In a second multiplexing mode, the circuit of the present invention accepts an input data stream consisting of input data that includes overhead, or "stuffed," data of a fixed pattern and transmits an output data stream consisting of the input data stripped of the stuffed data at a slower bit rate.

In the demultiplexing mode, the input data contains 24 channels of 16-bit data transmitted in a serial bit stream. Each 16-bit channel word is clocked into a serial-parallel converter and then written to the first word of a two word by 16-bit discrete register array. The register array allows data to be concurrently and independently written and read. An input counter and decoder control the timing of the input data stream read from and write to array operations.

Data is read out of the register array into a parallel-serial converter and transmitted as output data in a serial bit stream. The output data stream contains 32 channels of 16-bit data which consists of the 24 channels of input data and eight "stuffed" channels. The data channels and stuffed channels are interleaved in a fixed relationship, with three data channels followed by one stuffed channel. Data for the stuffed channels is stored in the second word location of the register array. A 2:1 multiplexer connected between the register array and the parallel-serial converter gates between receiving data from the first word of the register array into which input data is received and the second word of the array into which the stuffed data is stored. An output counter and decoder control the timing of the output data stream write and array read operations.

Since 24 channels of data is received by the circuit and 32 channels are transmitted by the circuit over an equivalent time span, the output bit rate will be faster than the input bit rate. In order to avoid read/write collisions in the register array, a suitable delay is introduced on the output side as derived below.

In the multiplexing mode, the circuit operates in a manner that is essentially the converse of the demultiplexing mode just described. In the multiplexing mode, the input data contains 32 channels including eight stuffed channels, and the output data contains the 24 non-stuffed channels of the input data, both as described above. Input channel words are consecutively written into the register array with the exception of the stuffed words, which are ignored. The output data stream consists of the non-stuffed input channel words. In order to avoid read/write collisions in the register array, a suitable delay is introduced on the output side as derived below. In this mode, the 2:1 multiplexer which operates in the demultiplexing mode to interleave stuffed data into the output stream is not present. Input and output counters and decoders control the timing of the read and write operations.

DESCRIPTION OF THE PREFERRED EMBODIMENT

Figure 1:
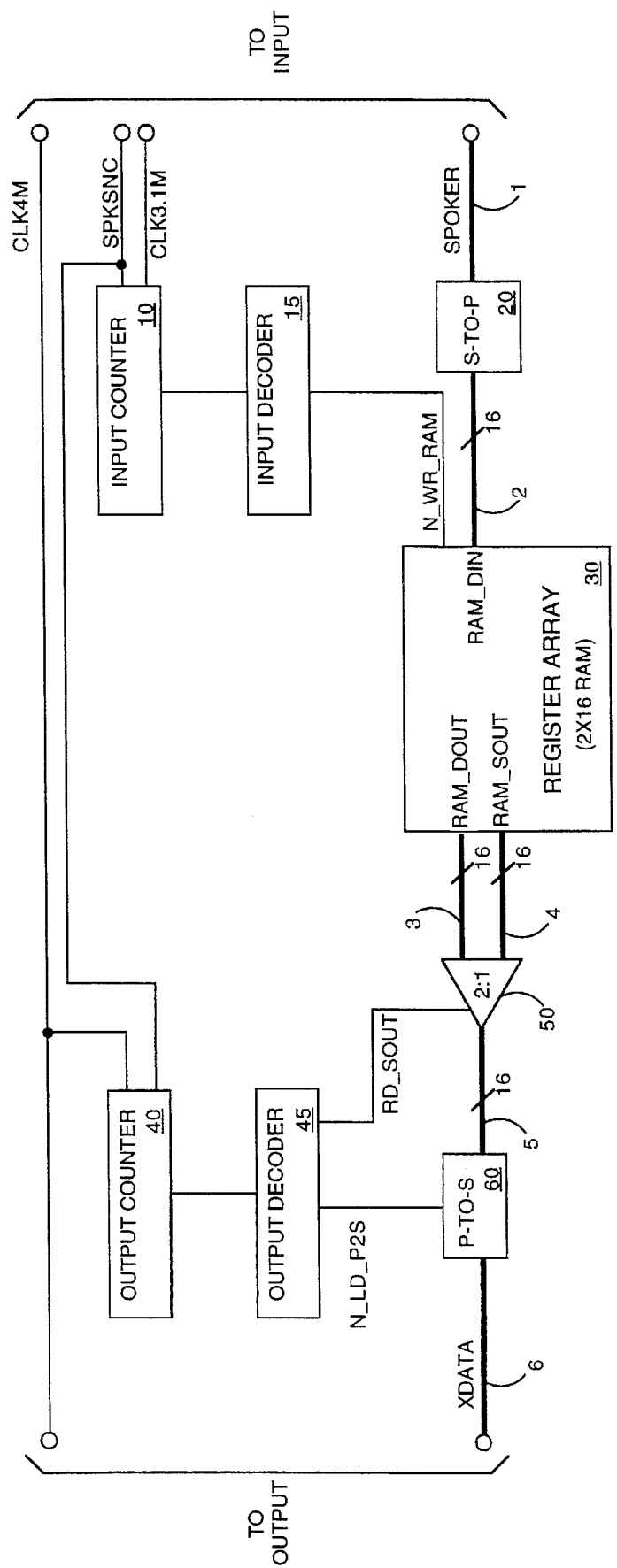
FIG. 1 is a block diagram of a first embodiment of a data rate conversion circuit.

Referring now to FIG. 1, a first embodiment of the data rate conversion circuit is shown. 9-bit binary input counter 10 is driven by external 3.088 MHz input signal CLK3.1M and external synchronization signal SPKSNC. Input counter 10 is connected to input decoder circuit 15 which provides signal N_WR_RAM.

A serial input data stream is received on connection SPOKER 1 of serial-parallel converter 20. Serial-parallel converter 20 is further connected to two-word-by-16-bit discrete register array circuit 30 by 16-lead connection RAM_DIN 2. Signal N_WR_RAM from input decoder circuit 15 to discrete register array circuit 30 causes a 16-bit word to be loaded from serial-parallel converter 20 to the first word of discrete register array circuit 30 over connection RAM_DIN 2.

9-bit binary output counter 40 is driven by external 4.096 MHz input signal CLK4M and synchronization signal SPKSNC. Output counter 40 is connected to output decoder circuit 45 which provides signals RD_SOUT, and M_LD_P2S.

2:1 multiplexer 50 accepts input from output connection RAM_DOUT 3 or from output connection RAM_SOUT 4 of discrete register array circuit 30 based on signal RD_SOUT from output decoder circuit 45 to 2:1 multiplexer 50. The output of 2:1 multiplexer 50 is connected to parallel-serial converter 60 by 16-lead connection 5. Signal N_LD_P2S causes a 16-bit word to be loaded from discrete register array circuit 30 to parallel-serial converter 60 through 2:1 multiplexer 50 and transmitted to the serial output data stream over connection XDATA 6.

The present invention can be considered in three logical parts: the input operations in which the input data arriving on connection SPOKER 1 are written to discrete register array circuit 30, the output operations in which the input data written to discrete register array circuit 30 are read, interleaved with the stuffed data and transmitted as output over connection XDATA 6, and the timing and other considerations that govern the relationship between the input and output data streams.

Input data arriving at serial-parallel converter 20 on connection SPOKER 1 is formatted as a serial bit stream consisting of input frames of 24 consecutive channel words of 16 bits each. Each set of 24 channel words is followed by two frame spacing bits as the last two bits of the frame. Typically, T1 spans consist of 24 channels of eight bits each with each 24 channel word frame ending with one frame spacing bit. Since the frames of the current invention consist of 24 words of 16 bits each, two frame spacing bits are used so that the total bit count will be consistent with typical T1 spans. The input data on connection SPOKER 1 arrives at a rate of 3.088 Mbps corresponding to the 3.088 MHz external clock signal OLK3.1M. An input frame and an output frame each take 125 μSEC to be transmitted.

Figure 2:
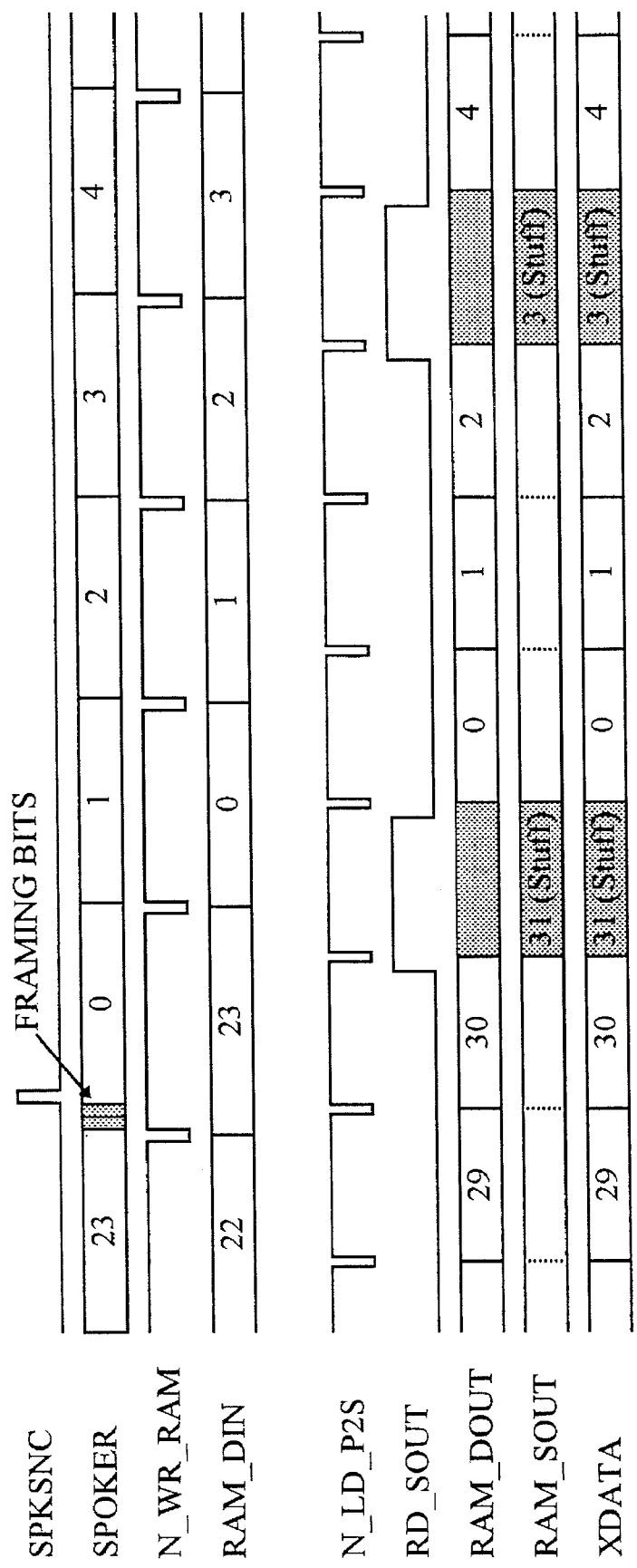
FIG. 2 is a timing diagram for the embodiment depicted in FIG. 1.

As shown in FIG. 2, external synchronization signal SPKSNC arrives at input counter 10 and output counter 40 concurrent with the arrival of bit 0 of channel 0 of the input data stream at serial-parallel converter 20 over connection SPOKER 1. When synchronization signal SPKSNC is received, input counter 10 is reset to zero to correspond with the channel number and bit position of the input frame of the data arriving on connection SPOKER 1. As the last bit of each channel word has been clocked into serial-parallel converter 20, signal N_WR_RAM from input decoder 15 to serial-parallel converter 20 is asserted and causes the channel word in serial-parallel converter 20 to be read into the first word of discrete register array circuit 30 over connection RAM_DIN 2.

The framing bits at the end of each frame are effectively ignored in the data steam input operation. Although the framing bits are read into serial-parallel converter 20 over connection SPOKER 1, the framing bits are "popped off the top" of the 16-channel serial-parallel converter 20 before signal N_WR_RAM is asserted causing the 16-bit word in serial-parallel converter 20 to be read into the first word of discrete register array. Input counter 10 is reset to zero by signal SPKSNC immediately after the framing bits, and signal N_WR_RAM isn't asserted until just after bit count 15 of each channel word, i.e., until the 16 bits following the framing bits are read into serial-parallel converter 20.

Concurrent with the input operations above, data is being read from discrete register array circuit 30 into parallel-serial converter 60 and transmitted as an output stream on connection XDATA 6. Output data transmitted on connection XDATA 6 is formatted as a serial bit stream consisting of output frames of 32 consecutive channel words of 16 bits each. The output data is transmitted at a rate of 4.096 Mbps corresponding to the 4.096 MHz external clock signal CLK4M.

Signal N_LD_P2S from output decoder 45 to parallel-serial converter 60 is asserted each 16 counts of output counter 40 and causes a word to be read from discrete register array circuit 30 into parallel-serial converter 60 through 2:1 multiplexer 50 from output connections RAM_DOUT 3 or RAM_SOUT 4 of discrete register array circuit 30 based on signal RD_SOUT from output decoder circuit 45 to 2:1 multiplexer 50. Discrete register array circuit 30 is implemented such that both the data word presented to connection RAM_DOUT 3 and the stuffed word presented to connection RAM_SOUT 4 are continuously asserted on these connections. When signal RD_SOUT is asserted, data is read from the second word of discrete register array circuit 30 over connection RAM_SOUT 4. Otherwise, data is read from the first word of discrete register array circuit 30 over connection RAM_DOUT 3. The first word of discrete register array circuit 30 is the word into which input channel data words are written. The second word of discrete register array circuit 30 is where the stuffed data word is stored. As shown in FIG. 2, signal RD_SOUT is asserted for 16 counts one count prior to each fourth strobe of signal N_LD_P2S. In this way, the stuffed data word is interleaved every fourth channel word into the output stream.

Figure 3:
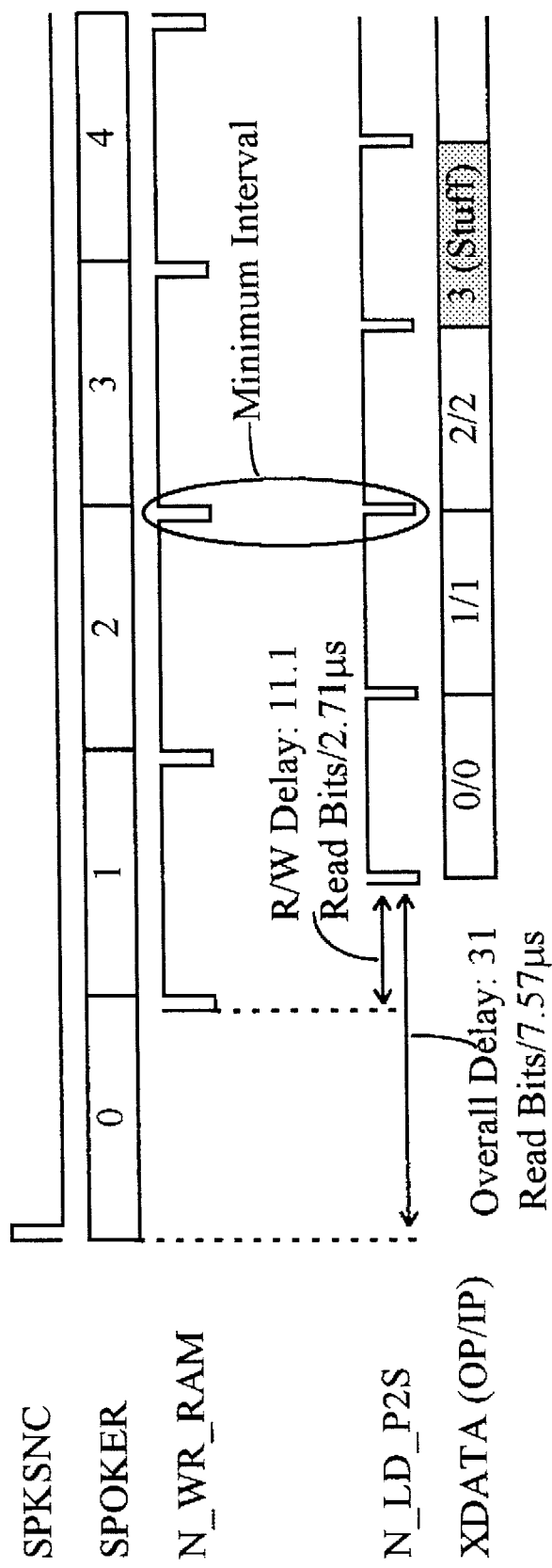
FIG. 3 is a timing diagram depicting the derivation of the minimum throughput delay for the embodiment depicted in FIG. 1.

Since the output data stream bit rate is faster than the input data stream bit rate, a suitable delay between when signal N_WR_RAM causes a channel word to be written into discrete register array circuit 30 and when signal N_LD_P2S causes that word to be read from the array must be introduced to ensure that an output read doesn't occur before the corresponding input data has been written. As shown in FIG. 3, the key interval in determining the minimum read/write delay is between the corresponding read and write to discrete register array circuit 30 of the third input channel word. The minimum overall delay for this embodiment is established by determining the minimum integer number of 4.096 MHz counter ticks required after signal SPKSNC is received to delay the strobe of signal N_LD_P2S corresponding to reading the first channel word of the frame from discrete register array circuit 30 such that each strobe of signal N_LD_P2S corresponding to the read of a channel word from discrete register array circuit 30 is after each corresponding strobe of signal N_WR_RAM corresponding to the write of the channel word to discrete register array circuit 30. A delay of 31 counter ticks will meet this condition. Setting output counter 40 to 1E1 Hex concurrent with the arrival of synchronization signal SPKSNC to correspond with the output frame channel word and bit position of the data on connection XDATA will result in the aforementioned 31 counter tick delay.

Because three input words are written for each four output words (i.e., three input words plus a stuffed word), the timing relationships between the first set of three input words and four output words might be expected to hold for all eight such sets in a frame. However, the input frame ends with two spacing bits which have the effect of slightly compressing the input channel words such that the intervals between when each third input channel word is written and when it is read increases slightly for each subsequent set in a frame until the eighth set of the frame has a delay between when the third channel word is written and read equal to the delay of the first set plus an additional delay equivalent to almost two input channel word bits corresponding to the two framing bits.

Figure 4:
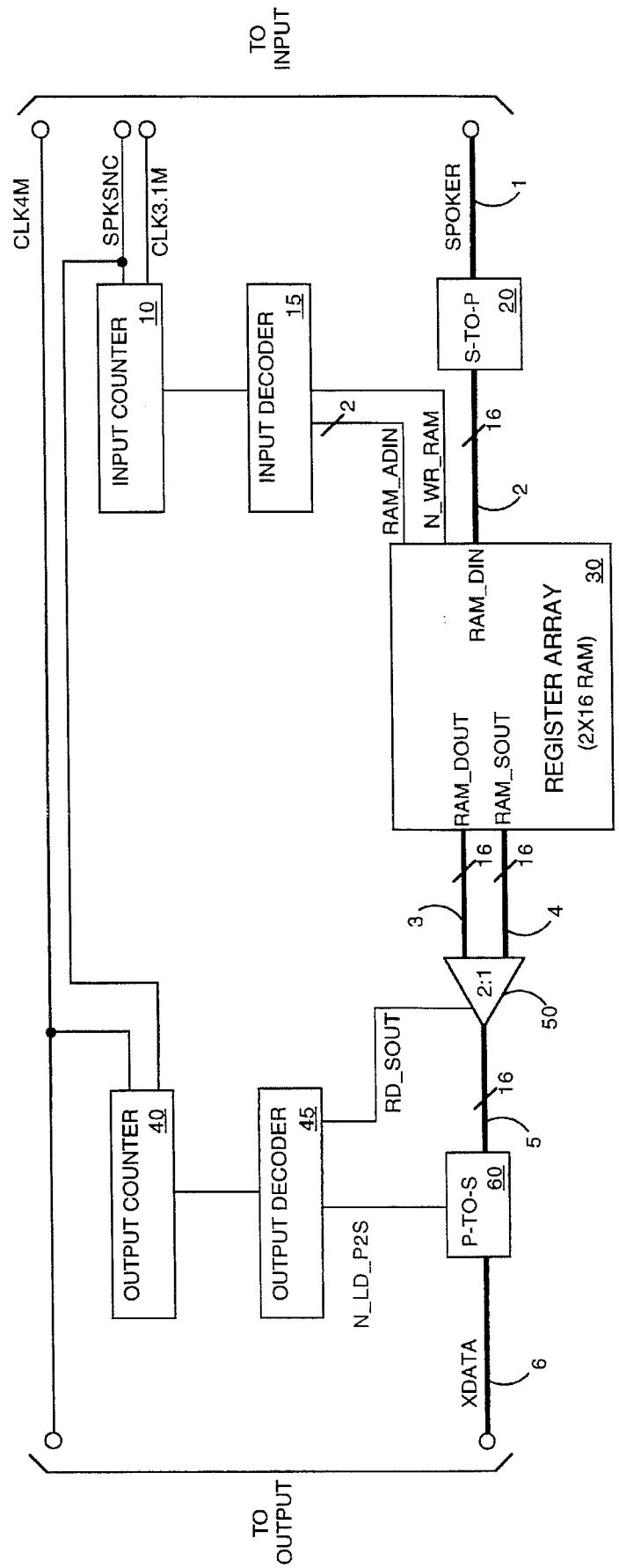
FIG. 4 is a block diagram of a second embodiment of a data rate conversion circuit.
Figure 5:
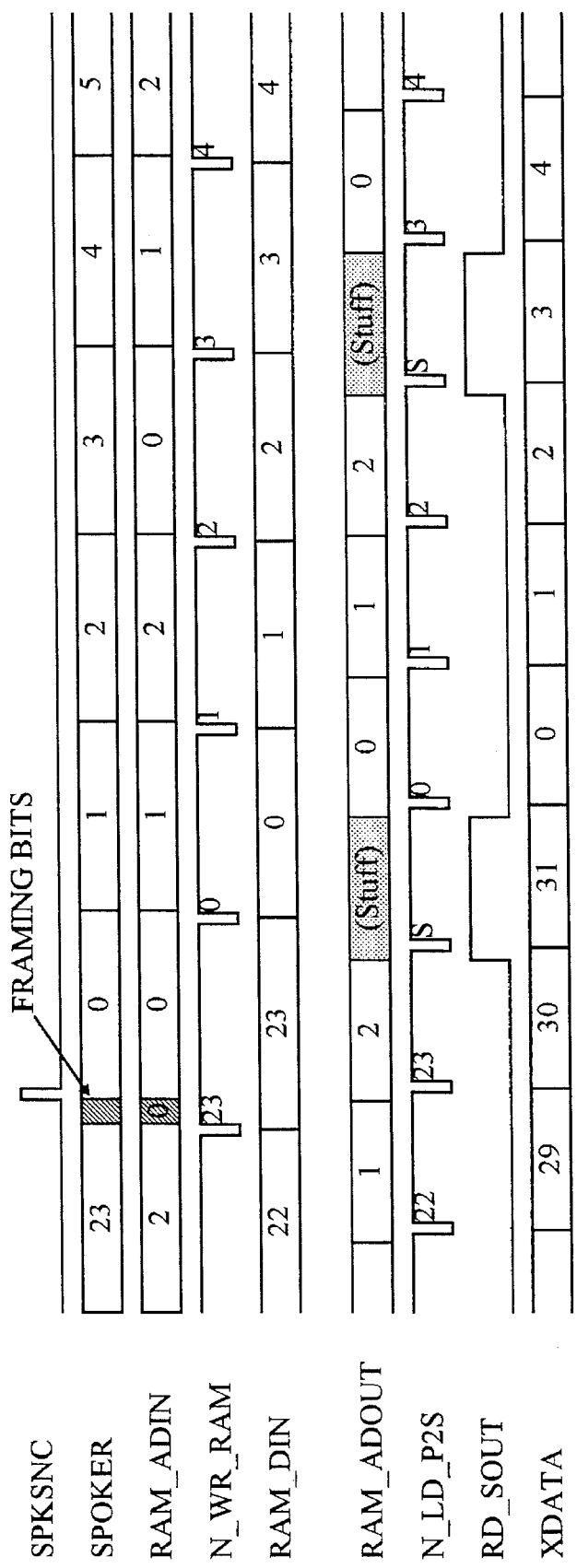
FIG. 5 is a timing diagram for the embodiment depicted in FIG. 4.
Figure 6:
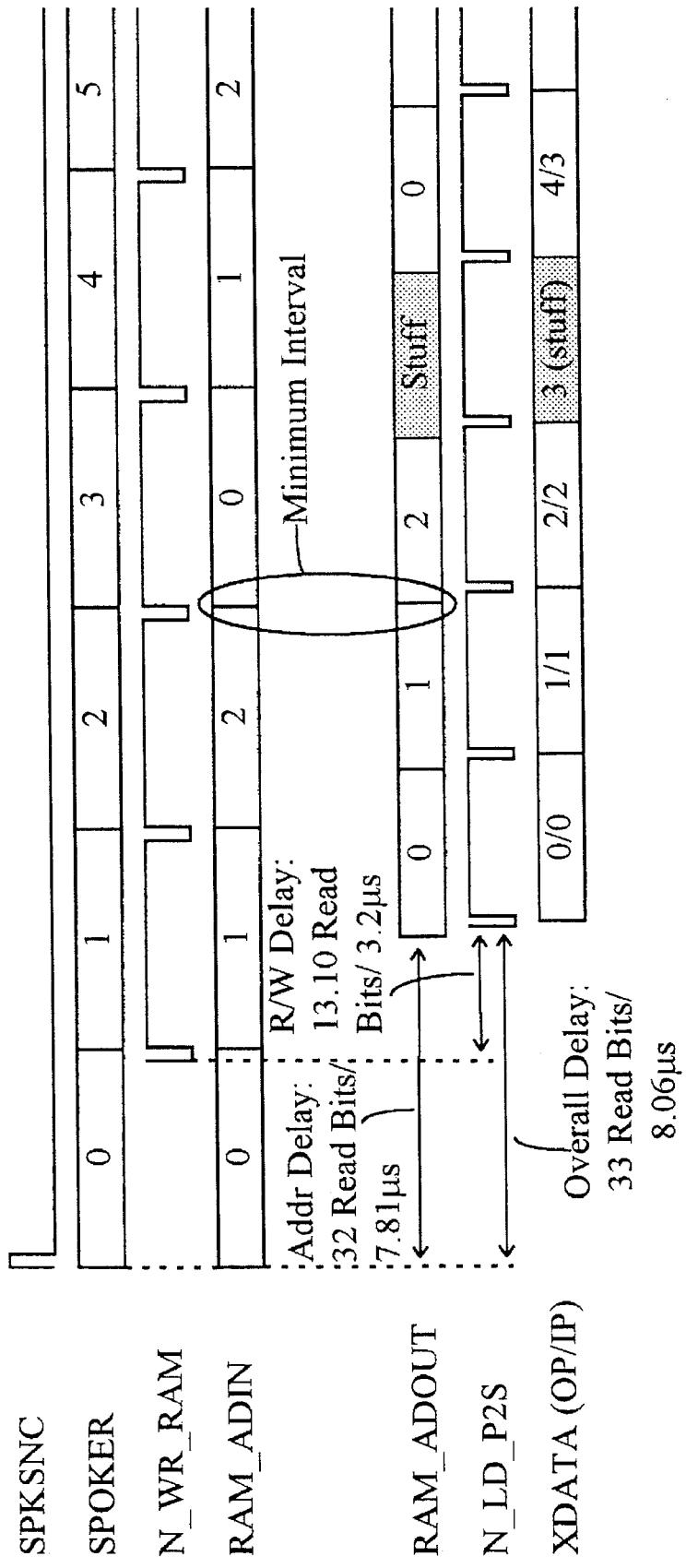
FIG. 6 is a timing diagram depicting the derivation of the minimum throughput delay for the embodiment depicted in FIG. 4.

Referring now to FIGS. 4-6, a second embodiment of the data rate conversion circuit is shown. Similar parts are designated by like reference numerals and are similarly operable with likewise named signals. As shown in FIG. 4, discrete register array circuit 30 is implemented as a four word by 16-bit array with input signals RAM_ADIN and RAM_ADOUT controlling the array addresses into which data words are written on connection RAM_DIN 2 and from which data words are read on connection RAM_DOUT 3 respectively. The first three words of discrete register array circuit 30 are accessed by connections RAM_DIN 2 and RAM_DOUT 3 and are used for storing input channel data words. The fourth word is accessed by connection RAM_SOUT 4 and is used for storing the stuffed data word.

As shown in FIG. 5, signal RAM_ADIN from input decoder 15 to discrete register array circuit 30 cycles through the values 0,1,2, corresponding to the addresses of the first three of the four data registers of discrete register array circuit 30, incrementing by one value at each 16th count of input counter 10. Signal N_WR_RAM causes the channel word in serial-parallel converter 20 to be written into discrete register array circuit 30 over connection RAM_DIN 2 into the word addressed by signal RAM_ADIN. Signal RAM_ADOUT from output decoder 45 to discrete register array circuit 30 similarly controls the address from which a channel word is read from discrete register array circuit 30 into parallel-serial converter 60 through 2:1 multiplexer 50. Signal RAM_ADOUT cycles through the discrete register array circuit 30 address values 0,1,2, advancing one value for each 16 counts of output counter 40 and is incremented one output counter 40 count before signal N_LD_P2S is asserted. After each third address value, the RAM_ADOUT address cycle is interrupted and signal RD_SOUT is asserted. After the interruption, the RAM_ADOUT cycle resumes with the next address value.

With this embodiment it is possible to align the RAM_ADIN and RAM_ADOUT signals such that neither signal will "point" to the same discrete register array circuit 30 address value at the same time. This provides design flexibility and a safety margin in allowing signals N_WR_RAM and N_LD_P2S to be strobed anytime during their respective RAM_ADIM and RAM_ADOUT intervals while ensuring that a register array word is read before a subsequent write into the same word. As shown in FIG. 6, the key intervals in aligning the RAM_ADIN and RAM_ADOUT signals such that neither signal will "point" to the same register array address at the same time are those between corresponding RAM_ADIN and RAM_ADOUT signals of each third RAM_ADIM address value. The minimum overall delay for this embodiment will be achieved if the alignment is such that the RAM_ADIM interval containing the third RAM_ADIM address ends just before the corresponding RAM_ADOUT for the same register array address starts.

The minimum overall delay for this embodiment is established by determining the minimum integer number of 4.096 MHz counter ticks required after signal SPKSNC is received to delay the asserting of signal RAM_ADOUT corresponding to reading the first channel word of the frame from discrete register array circuit 30 such that each assertion of signal RAM_ADOUT corresponding to the read of a channel word from discrete register array circuit 30 is after each corresponding assertion of signal RAM_ADIM corresponding to the write of the channel word to discrete register array circuit 30. A delay of 32 counter ticks will meet this condition. Setting output counter 40 to 1DF Hex concurrent with the arrival of synchronization signal SPKSMO to correspond with the output frame channel word and bit position of the data on connection XDATA 6 will result in the aforementioned 32 counter tick delay.

Figure 7:
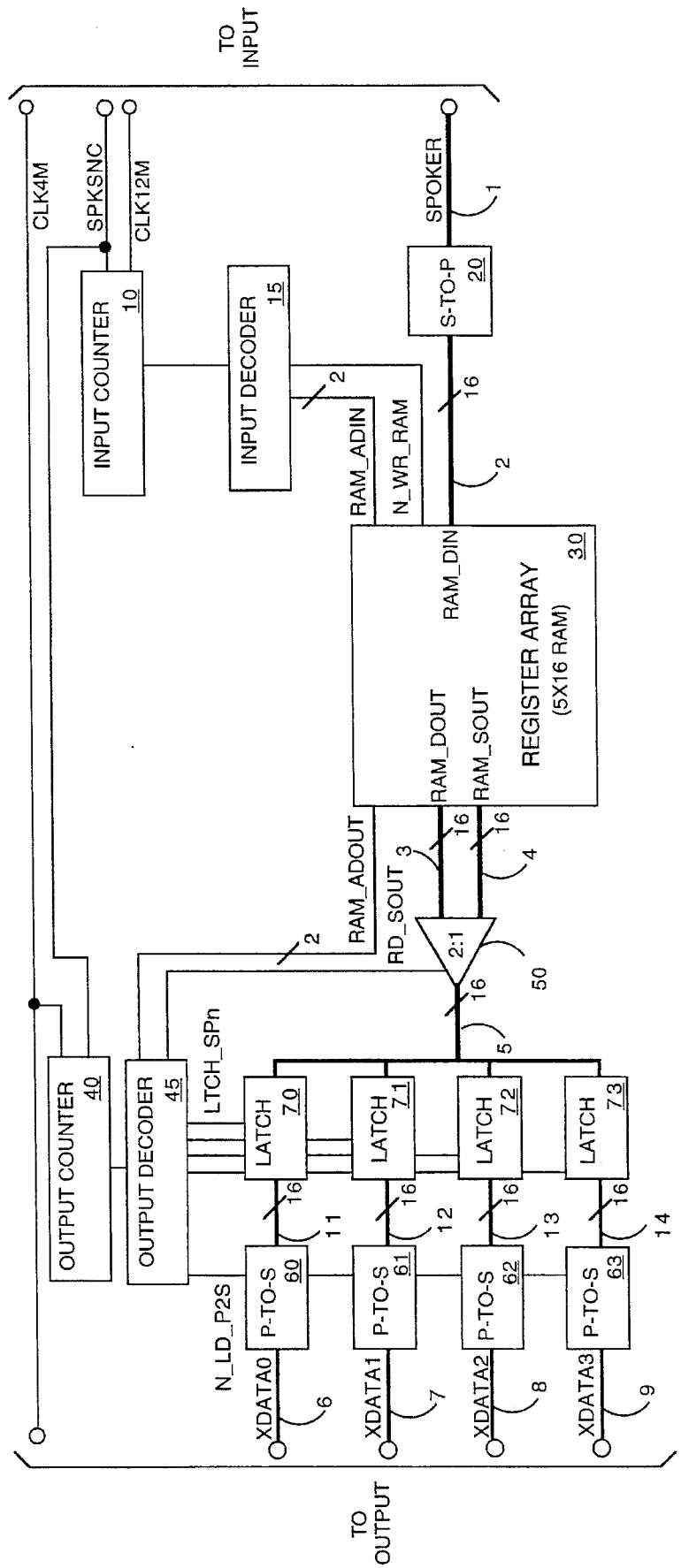
FIG. 7 is a block diagram of a third embodiment of a data rate conversion circuit.
Figure 8:
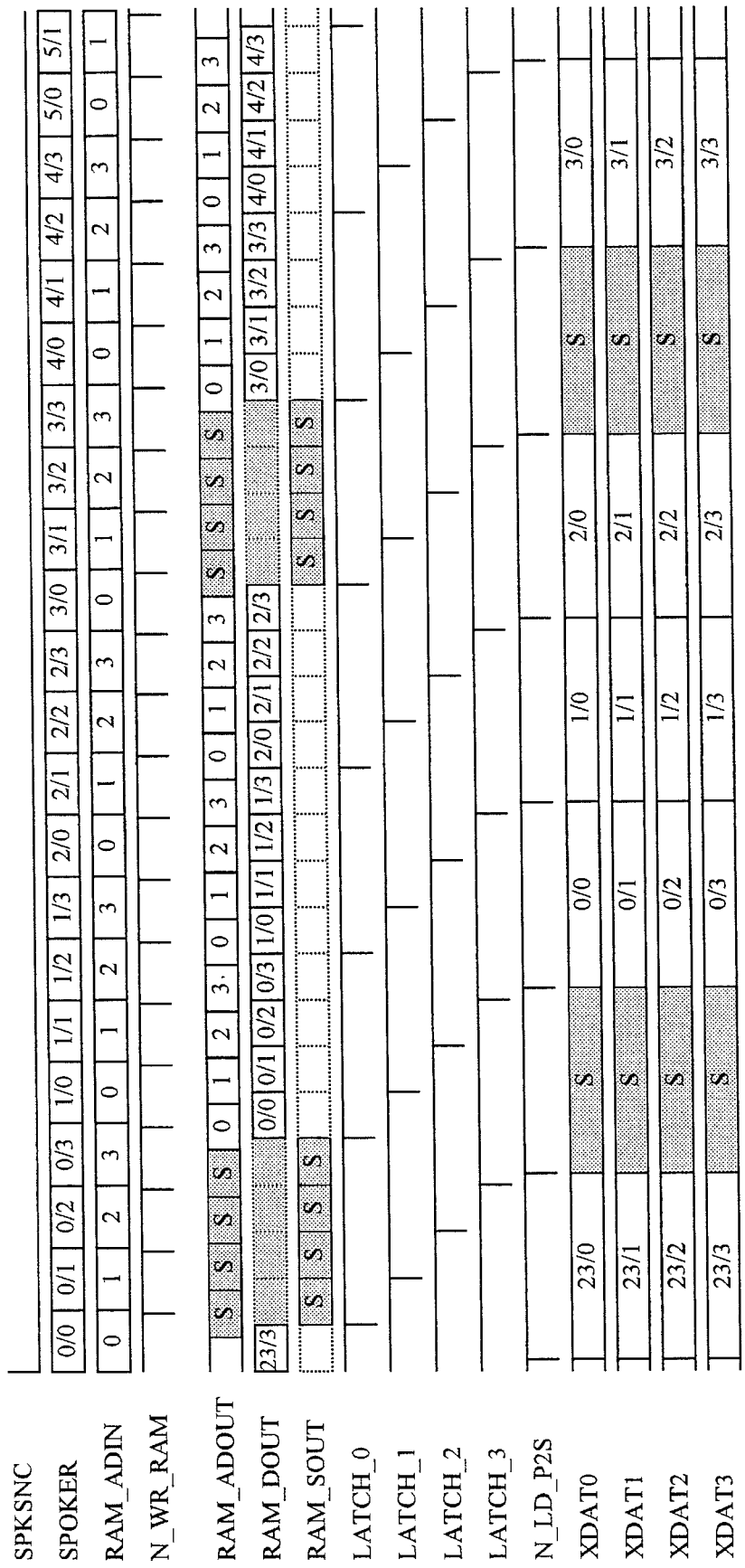
FIG. 8 is a timing diagram for the embodiment depicted in FIG. 7.
Figure 9:
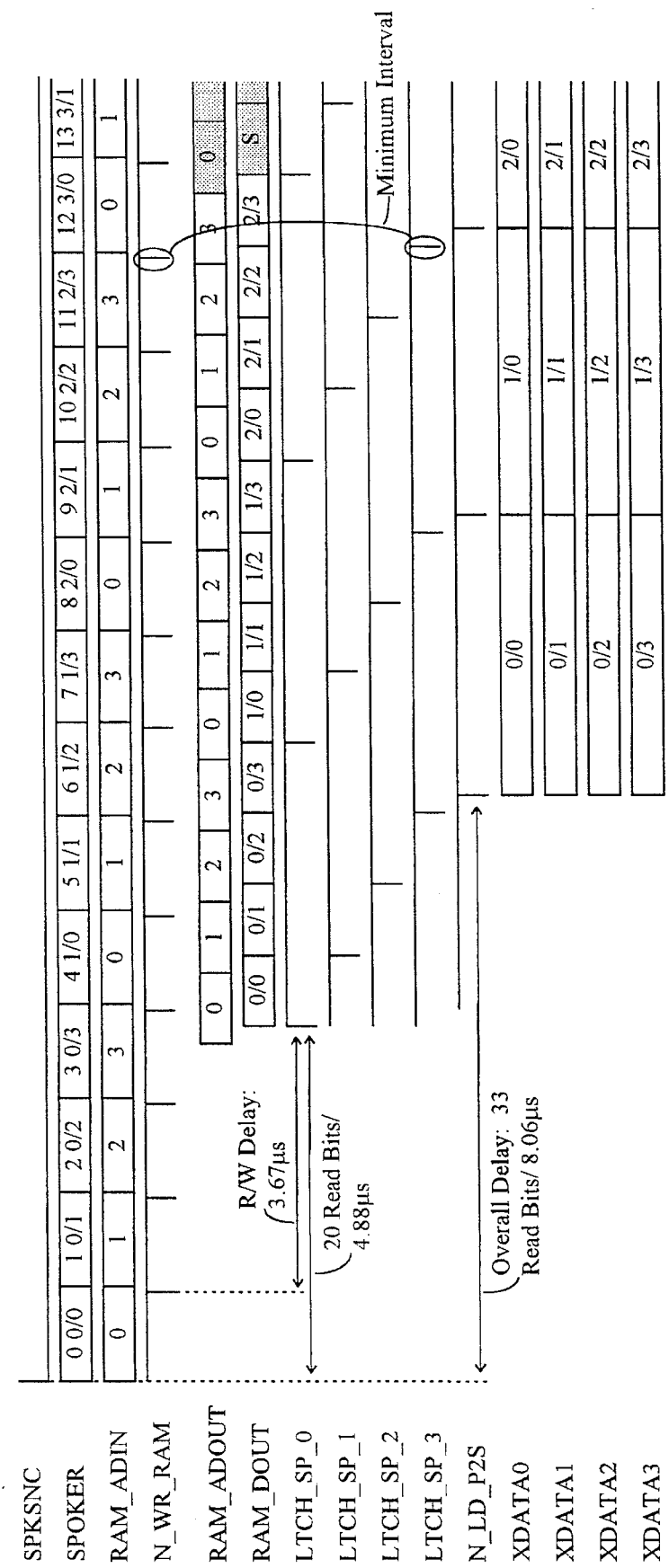
FIG. 9 is a timing diagram depicting the derivation of the minimum throughput delay for the embodiment depicted in FIG. 7.

Referring now to FIGS. 7-9, a third embodiment of the data rate conversion circuit is shown. In this embodiment, the input serial data stream contains four spans of 24 data channels multiplexed into 96-channel frames with each frame ending with eight frame spacing bits. The data rate conversion circuit demultiplexes the input data stream into it's four constituent spans, interleaves a stuffed channel every third data channel into the output streams, and transmits the output serial data streams as four channel-aligned spans of 32 channels each. As shown on FIG. 7, input counter 10 is driven by external 12.352 MHz input signal CLK12M corresponding to the input stream bit rate of 12.352 Mbps, and external synchronization signal SPKSNC. As in the previous embodiments an input frame is received each 125 μs, however since the input frame consists of four spans, the input data bit rate and the clock signal are four times as fast. Discrete register array circuit 30 is implemented as a five word by 16-bit array with the first four words accessible by connections RAM_DIN 2 and RAM_DOUT 3 and word five accessible by connection RAM_SOUT 4. Signal RAM_ADIN cycles through the values 0,1,2,3 with the first input channel word being read into array address 0. Latches 70-73 are connected in parallel to 2:1 multiplexer 50 through connection 5. Signals LTCH_SP0-LTCH_SP3, shown collectively as LTCH_SPn, from output decoder 45 to latches 70-73 independently control the clearing and enabling of each latch. Latches 70-73 are further connected to parallel-serial converters 60-63 over connections 11-14 as shown. Signal N_LD_PZS from output decoder 45 is connected to all parallel-serial converters 60-63 and causes them to simultaneously load the channel words in latches 70-73 and transmit the channel words on connections XDATA0-XDATA3 6-9 at a rate of 4.096 Mbps corresponding with external clock signal CLK4M.

As shown in FIG. 8, input data on connection SPOKER 1 is formatted such that span 0 channel 0 bit 0 arrives concurrent with signal SPKSNC. Span 1 channel 0 follows, then span 2 channel 0, span 3 channel 0, span 0 channel 1 and so on to span 23 channel 3 followed by 8 frame spacing bits. The input data can be logically grouped into sets of four input channel words corresponding with a given channel number for all four spans, e.g., span 0 channel 0, span 1 channel 0, span 2 channel 0, and span 3 channel 0. In operation, each word in a set of four input words is consecutively read into latches 70–73 then strobed simultaneously into parallel-serial converters 60–63 by signal N__LD__P2S and transmitted as four channel-aligned serial output data streams XDATA0–XDATA3 6–9. Following each third set of four input channel words, signal RD__SOUT is asserted and the stuffed word in location five of discrete register array 30 is read over connection RAM__SOUT 4 into each latch 70–73 and transmitted on connections XDATA0–XDATA3 6–9.

As shown in FIG. 9, the key interval in determining the minimum overall delay is between the corresponding read to and write from discrete register array circuit 30 of input word 11 or span 2 channel word 3, the input channel word that is received just before the stuffed data is interleaved into the output stream. The minimum overall delay for this embodiment was determined in a manner analogous to the previous embodiments, however read and write signals corresponding to the same memory addresses are used for comparison. A delay of 20 4.096 MHz clock ticks after signal SPKSMC is received before signal LTCM__SPO is strobed will result in the minimum overall delay. Setting output counter 40 to 1DF Hex concurrent with the arrival of synchronization signal SPKSMC to correspond with the output frame channel word and bit position of the data on connection XDATA will result in the aforementioned minimum delay.

Figure 10:
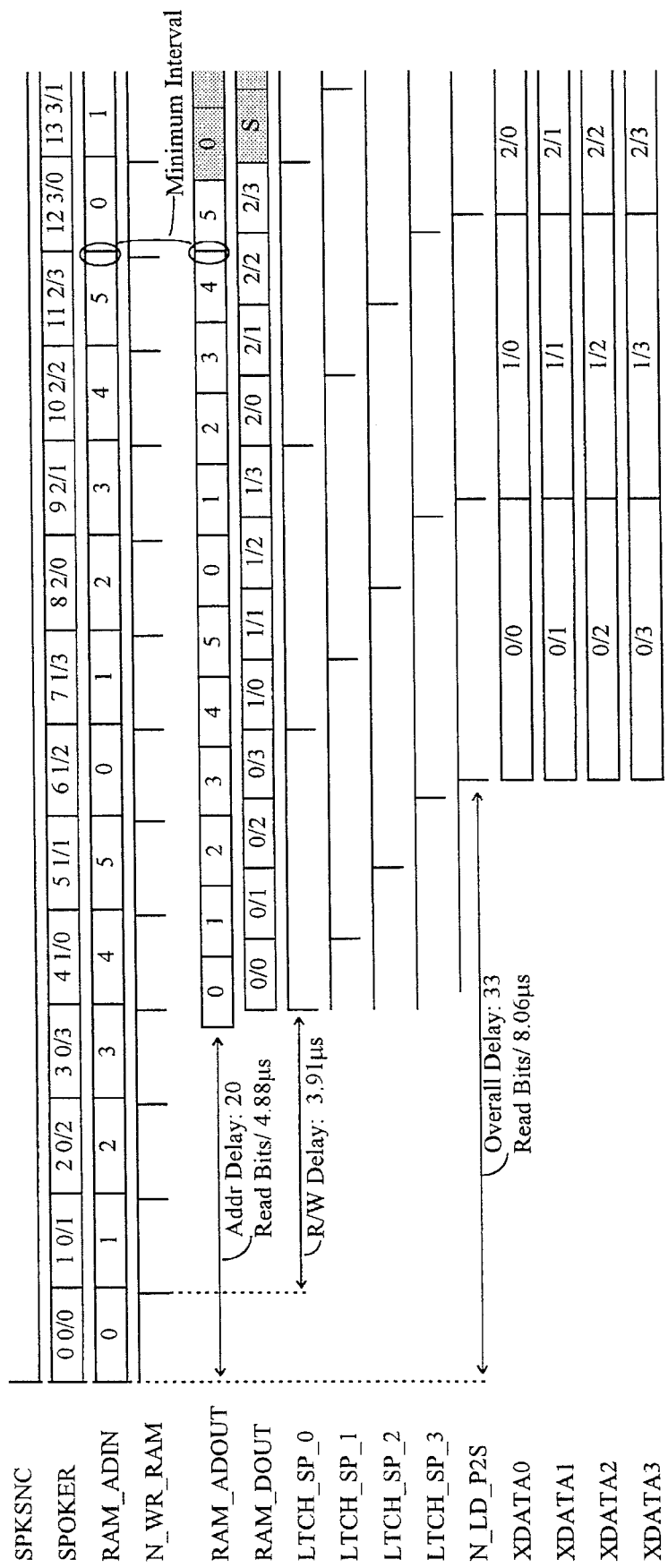
FIG. 10 is a timing diagram depicting the derivation of the minimum throughput delay for a fourth embodiment of a data rate conversion circuit.

FIG. 10 shows the timing diagram for a fourth embodiment where the four-span data rate converter signals RAM__ADIM and RAM__ADOUT are aligned such that neither signal will "point" to the same discrete register array circuit 30 address value at the same time. This embodiment requires that discrete register array circuit 30 have seven registers: six for input data channel word storage and one for the stuffed data word.

As shown in FIG. 10, the key interval in aligning the RAM__ADIN and RAM__ADOUT signals such that neither signal will "point" to the same register array address at the same time is between corresponding RAM__ADIN and RAM__ADOUT signals of the RAM__ADOUT address value just prior to interleaving the stuffed data into the output stream.

The minimum overall delay for this embodiment will be achieved if the alignment is such that the RAM__ADIM interval containing the RAM__ADOUT address value just prior to interleaving the stuffed data ends just before the corresponding RAM__ADOUT for the same register array address starts.

The minimum overall delay for this embodiment was determined in a manner analogous to the previous embodiments. A delay of 20 4.096 MHz clock ticks after signal SPKSNC is received before signal LTCH__SP0 is strobed will result in the minimum overall delay. Setting output counter 40 to 1DF Hex concurrent with the arrival of synchronization signal SPKSNC to correspond with the output frame channel word and bit position of the data on connection XDATA will result in the aforementioned minimum delay.

Figure 11:
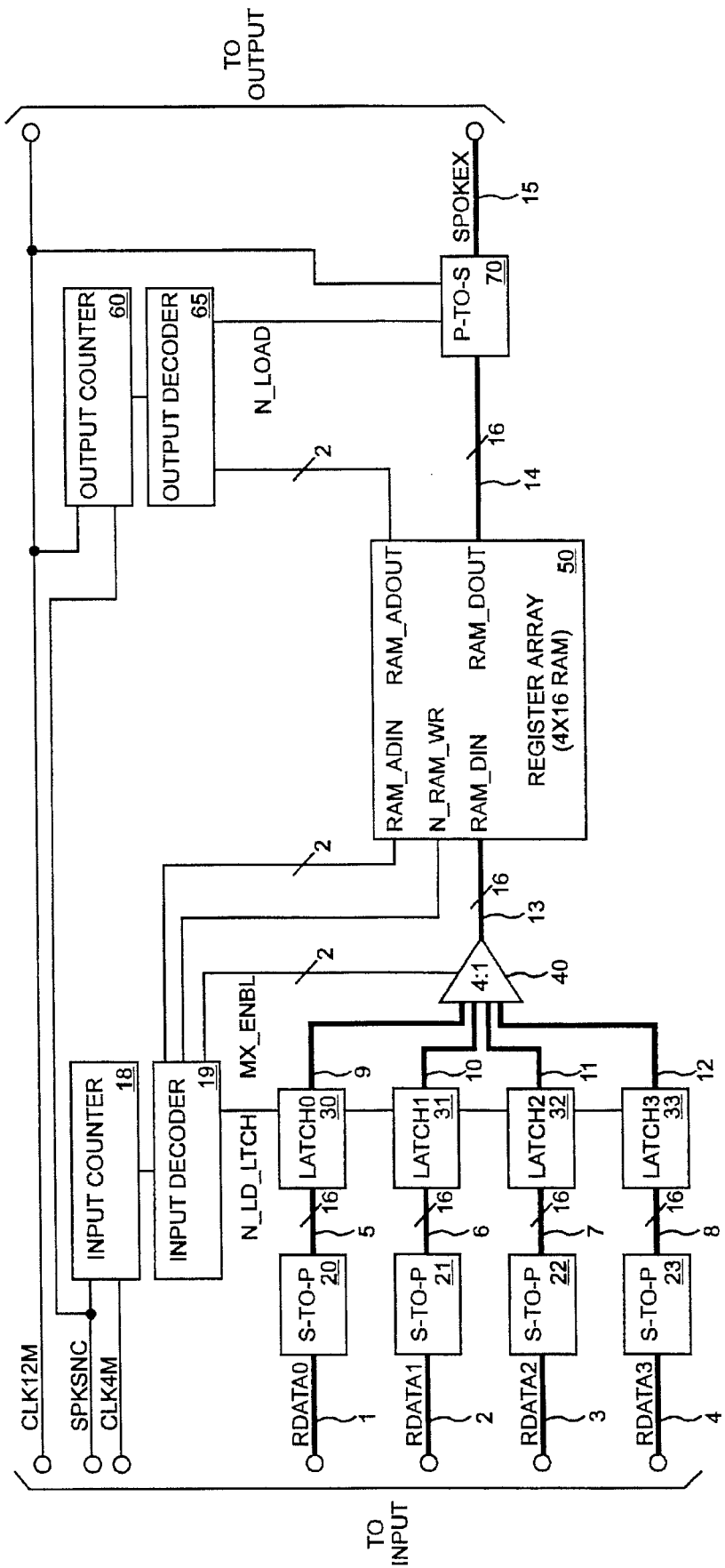
FIG. 11 is a block diagram of a fifth embodiment of a data rate conversion circuit.
Figure 12:
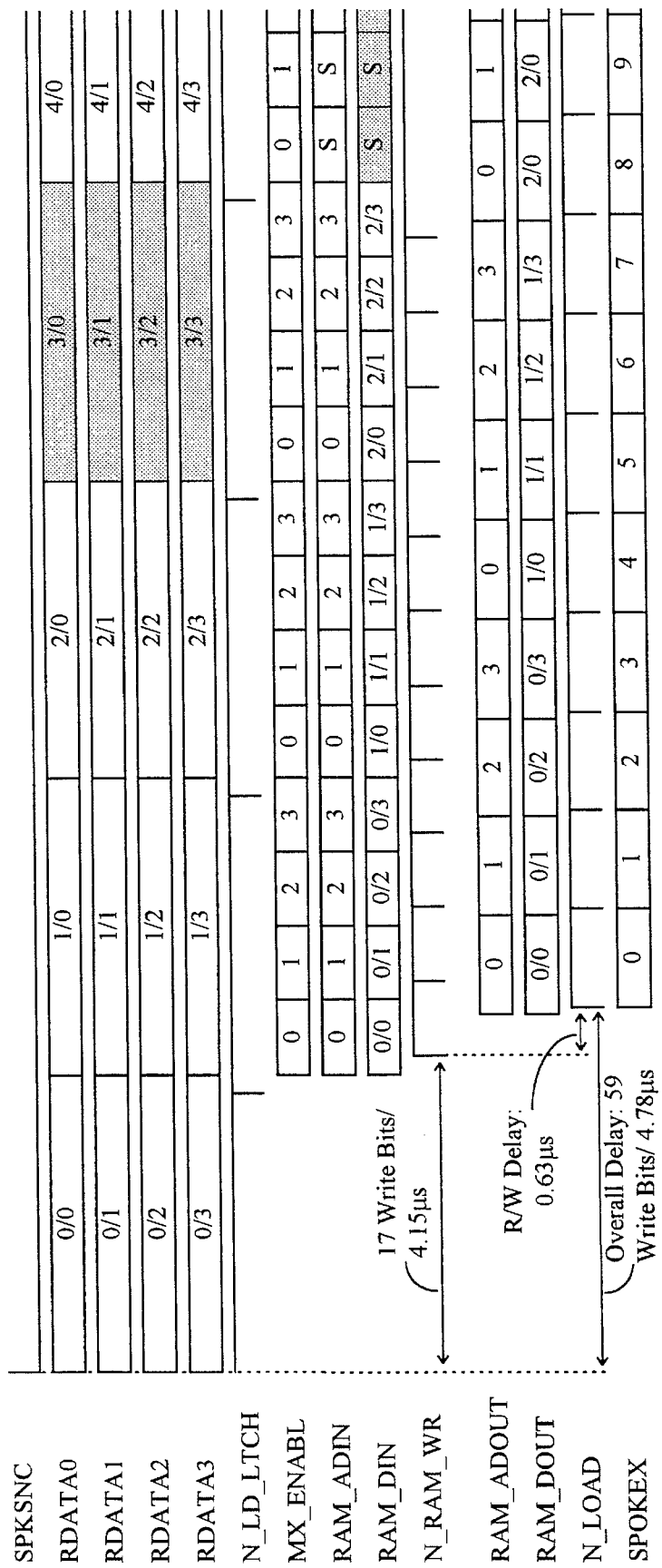
FIG. 12 is a timing diagram depicting the derivation of the minimum throughput delay for the embodiment

Referring now to FIGS. 11–12, a fifth embodiment of the data rate conversion circuit is shown. In this embodiment, the input data contains four separate channel-aligned spans. Each span comprises a serial data stream of 32 data channels with every fourth channel word being a stuffed word. The data rate conversion circuit multiplexes the input data spans, stripped of stuffed channel words, into a single serial stream comprising 96-channel frames with each frame ending with eight frame spacing bits.

As shown on FIG. 11, 9-bit input counter 18 is driven by external 4.096 MHz input signal CLK4M corresponding to the input stream bit rate of 4.096 Mbps, and external synchronization signal SPKSNC. Input counter 18 is connected to input decoder 19 which provides signals N__LD__LTCH, RAM__ADIN, N__RAM__WR, and MX__ENBL. Four channel-aligned serial input data streams are received on connections RDATA0–RDATA3 1–4 of serial-parallel converters 20–23. Serial-parallel converters 20–23 are further connected to latches LATCH0–LATCH3 30–33 by 16-lead connections 5–8. Signal N__LD__LTCH from input decoder 19 is asserted simultaneously on all of LATCH0–LATCH3 30–33 and causes the current 16 bits in serial-parallel converters 20–23 to be loaded into latches LATCH0–LATCH3 30–33 respectively. 4:1 multiplexer 40 gates input from LATCH0–LATCH3 30–33 over 16-lead connections 9–12 to 4-word by 16-bit register array 50 over 16-lead connection RAM__DIN 13. Signal MX__ENBL from input decoder 19 to 4:1 multiplexer 40 controls which of LATCH0–LATCH3 30–33 is gated through 4:1 multiplexer 40 to register array 50 over 16-lead connection RAM__DIN 13. The output of 4:1 multiplexer 40 is continuously asserted on connection RAM__DIN 13. The operations of register array 50 are controlled by 3 signals: signal N__RAM__WR causes a word to be written to one of the four storage locations of register array 50 over connection RAM__DIN 13, signal RAM__ADIN contains the address of the register array 50 storage location in which to receive the word that signal N__RAM__WR causes to be written, signal RAM__ADOUT contains the address of the register array 50 storage location which contents is continuously asserted on connection RAM__DOUT 14. Parallel-serial converter 70 accepts input from register array 50 over connection RAM__DOUT 14 and transmits a serial bit stream out of the circuit over connection SPOKEX 15. Signal N__LD__P2S to parallel-serial converter 70 causes a word to be written into parallel-serial converter 70 from register array 50 over connection RAM__DOUT 14. 11-bit binary output counter 60 is driven by external 12.352 MHz input signal CLK12M and synchronization signal SPKSNC. Output counter 60 is connected to output decoder 65 which provides signals RAM__ADOUT, and N__LOAD.

As shown in FIG. 12, input data on connections RDATA0–RDATA3 1–4 is formatted such that channel 0 bit 0 of each span arrives concurrent with signal SPKSNC. In operation, each channel word in the four spans is simultaneously clocked into serial-parallel converters 20–23. After the last bits of each set of four concurrent channel words are read into serial-parallel converters 20–23, signal N__LD__LTCH is strobed and causes the 16 bit contents of each of serial-parallel converters 20–23 to be loaded into latches LATCH0–LATCH3 30–33 respectively. As shown in FIG. 12, signal MX__ENBL cycles through the values 0,1,2,3 corresponding to connections 9–12 of LATCH0–LATCH3 30–33 and causes the channel words in LATCH0–LATCH3 30–33 to be consecutively asserted through 4:1 multiplexer 40 to register array connection RAM__DIN 13. Signal N__RAM__WR is strobed one input counter 18 tick after signal MX__ENBL advances to it's next value and causes the word asserted on connection RAM__DIN 13 to be written to register array 50. Signal RAM_ADIN cycles through the values 0,1,2,3 corresponding to the storage locations of register array 50 and causes each word written to register array 50 to be stored in consecutive storage locations 0–4 of register array 50. Concurrent with these operations to write input data into register array 50, data is being read from the register array. Signal RAM_ADOUT cycles through the values 0,1,2,3 corresponding to the storage locations of register array 50 and causes the contents of the register array 50 storage locations to be consecutively asserted on connection RAM_DOUT 14. Signal N_LOAD is strobed one output counter 60 tick after signal RAM_ADOUT advances to it's next value and causes the word asserted on connection RAM_DIN 13 to be written to parallel-serial converter 70 where the word is then transmitted in a 12.352 Mbps data stream out of the circuit over connection SPOKEX 15.

FIG. 12 shows the timing values necessary to achieve the minimum overall delay in data throughput. The minimum overall delay for this embodiment was determined in a manner analogous to the previous embodiments. A delay of 59 12.352 MHz clock ticks after signal 8PKSNC is received before signal N_LOAD corresponding to the transmission of span 0 word 0 is strobed will result in the minimum overall delay. Setting output counter 60 to 5CD Hex concurrent with the arrival of synchronization signal SPKSNC to correspond with the output frame channel word and bit position of the data on connection SPOKEX will result in the aforementioned minimum delay.

Figure 13:
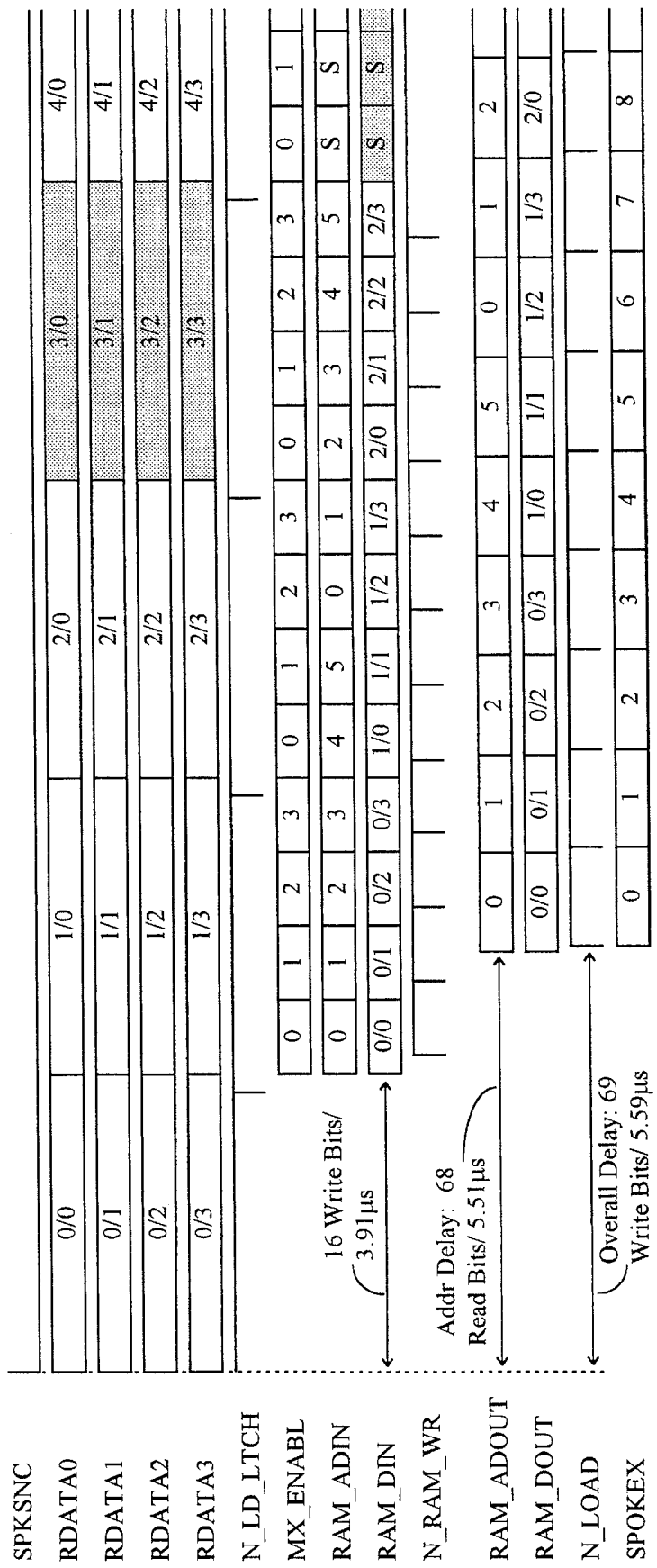
FIG. 13 is a timing diagram depicting the derivation of the minimum throughput delay for a sixth embodiment of a data rate conversion circuit.

FIG. 13 shows the timing diagram for a sixth embodiment of the present invention that operates similarly to the multiplexing mode embodiment described directly above. In this embodiment, the four-span data rate converter signals RAM_ADIN and RAM_ADOUT are aligned such that neither signal will "point" to the same discrete register array circuit 50 address value at the same time. This embodiment requires that discrete register array circuit 50 have six input data channel word storage locations. The minimum overall delay for this embodiment was determined in a manner analogous to the previous embodiments. A delay of 68 12.352 MHz clock ticks after signal SPKSNC is received before signal RAM_DOUT contains the value "0" corresponding with span 0 word 0 will result in the minimum overall delay. Setting output counter 60 to 5C4 Hex concurrent with the arrival of synchronization signal SPKSNC to correspond with the output frame channel word and bit position of the data on connection XDATA will result in the aforementioned minimum delay.

While the inventive system has been particularly shown and described with reference to various embodiments, it is not intended to be exhaustive nor to limit the invention to the embodiments disclosed. It will be apparent to those skilled in the art that modifications can be made to the present invention without departing from the scope and spirit thereof. It is intended that the scope of the invention be defined by the claims appended hereto and their equivalents.

What is claimed is:

1. A data rate conversion circuit for use in a data transmission system having first and second data systems, said first data system being operated to transmit a synchronization signal, a first clock signal, a second clock signal and first data having a first data pattern comprising a serial bit stream of consecutive data frames forming a span, each of said data frames having a predetermined number of channel words, each of said words having a predetermined number of bits, said first data further including a first data rate corresponding to said first clock signal, said second data system being operated to receive said second clock signal and data having a second data pattern and a second data rate corresponding to said second clock signal, said data rate conversion circuit comprising:

storage means having an input storage location;

said storage means further comprising a stuffed storage location containing a stuffed word of predetermined pattern;

write control means connected between said first data system and said storage means, operated to receive said first data and to consecutively write each channel word into said input storage location at a rate related to said first data rate; and read control means connected between said storage means and said second data system, and operated to read said channel words from said input storage location and said stuffed word from said stuffed storage location at a rate related to said second data rate, said channel and stuffed words being read to form said second data pattern by periodically reading said stuffed word after a predetermined number of said channel words.

2. A data rate conversion circuit according to claim 1 wherein said write control means further comprises:

a serial-parallel converter connected between said first data system and said storage means, said serial-parallel converter being operated to receive said first data and convert it to parallel data;

an input counter operated to receive said first clock signal and said synchronization signal and generate a plurality of counter signals; and an input decoder connected to said input counter, said input decoder operated to generate a strobe signal in response to predetermined counter signals, whereby said strobe signal operates to cause said parallel data to be stored into said input storage location.

3. A data rate conversion circuit according to claim 2 wherein said read control means further comprises:

a multiplexer connected to said storage means, said multiplexer being operated to receive data from said input and stuffed storage locations;

a parallel-serial converter connected between said multiplexer and said second data system, said parallel-serial converter being operated to receive parallel data from said multiplexer and convert it to serial data;

an output counter operated to receive said second clock signal and said synchronization signal and generate a plurality of counter signals; and an output decoder connected to said output counter, said output decoder operated to generate a plurality of strobe signals in response to predetermined counter signals, whereby said strobe signals operate to cause said multiplexer to gate between said input and stuffed storage locations to form said second data, and to cause said serial data to be transmitted to said second data system.

4. A data rate conversion circuit according to claim 3, said storage means having a defined write cycle time, wherein each of said strobe signals operating to cause said parallel data to be stored into said input storage location and each of said strobe signals operating to cause said serial data corresponding to said parallel data to be transmitted to said second data system are temporally aligned such that each of said strobe signals operating to cause said parallel data to be stored occurs at least a predetermined minimum time interval before each of said strobe signals operating to cause said serial data corresponding to said parallel data to be transmitted, said predetermined minimum time interval related to said defined write cycle time.

5. A data rate conversion circuit according to claim 3, wherein:

said storage means further comprises a plurality of input storage locations;

said input decoder further operates to generate an address signal in response to predetermined input counter signals, said address signal containing the address of one of said plurality of input storage locations into which a channel word of said parallel data is stored; and said output decoder further operates to generate an address signal in response to predetermined output counter signals, said address signal containing the address of one of said plurality of input storage locations from which said multiplexer reads said channel words in forming said second data.

6. A data rate conversion circuit according to claim 5, wherein said input decoder address signals and said output decoder address signals are temporally aligned such that said address signals do not contain the same input storage location address value at the same time.

7. A data rate conversion circuit according to claim 5, said first data pattern further comprising a plurality of spans, said channel words of said spans interleaved to form a single serial bit stream having a predetermined pattern, wherein said read control means further comprises:

a plurality of latches connected to said multiplexer, each of said latches being operable to read channel words of one of said plurality of spans;

a plurality of parallel-serial converters connected between said plurality of latches and said second data system, each of said parallel-serial converters being connected to one of said latches and being operated to receive parallel data from said latches and convert it to serial data; and said output decoder further operating to generate a plurality of strobe signals in response to predetermined signals from said output counter, each of said strobe signals being connected to one of said latches and being operated to cause one of said latches to read a channel word from said multiplexer, whereby said second data pattern is formed and further comprises said plurality of spans, each of said spans comprising a separate serial bit stream.

8. A data rate conversion circuit according to claim 6, said first data pattern further comprising a plurality of spans, said channel words of said spans interleaved to form a single serial bit stream having a predetermined pattern, wherein said read control means further comprises:

a plurality of latches connected to said multiplexer, each of said latches being operable to read channel words of one of said plurality of spans;

a plurality of parallel-serial converters connected between said plurality of latches and said second data system, each of said parallel-serial converters being connected to one of said latches and being operated to receive parallel data from said latches and convert it to serial data; and said output decoder further operating to generate a plurality of strobe signals in response to predetermined signals from said output counter, each of said strobe signals being connected to one of said latches and being operated to cause one of said latches to read a channel word from said multiplexer, whereby said second data pattern is formed and further comprises said plurality of spans, each of said spans comprising a separate serial bit stream.

9. A data rate conversion circuit for use in a data transmission system having first and second data systems, said first data system being operated to transmit a synchronization signal, a first clock signal, a second clock signal and first data having a first data pattern comprising a serial bit stream of consecutive data frames forming a span, each of said data frames having a predetermined number of channel words and stuffed words, each of said channel and stuffed words having a predetermined number of bits, said channel and stuffed words interleaved to form a predetermined pattern, said first data further including a first data rate corresponding to said first clock signal, said second data system being operated to receive said second clock signal and data having a second data pattern and a second data rate corresponding to said second clock signal, said data rate conversion circuit comprising:

storage means having an input storage location;

write control means connected between said first data system and said storage means, operated to receive said first data and to consecutively write each of said channel words into said input storage location at a rate related to said first data rate; and read control means connected between said storage means and said second data system, operated to read said channel words from said input storage location at a rate related to said second data rate, convert said first data to said second data, and transmit said second data to said second data system.

10. A data rate conversion circuit according to claim 9 wherein said write control means further comprises:

a serial-parallel converter connected between said first data system and said storage means, said serial-parallel converter being operated to receive said first data and convert it to parallel data;

an input counter operated to receive said first clock signal and said synchronization signal and generate a plurality of counter signals; and an input decoder connected to said input counter, said input decoder operated to generate a strobe signal in response to predetermined counter signals, whereby said strobe signal operates to cause said parallel data to be stored into said input storage location.

11. A data rate conversion circuit according to claim 10 wherein said read control means further comprises:

a parallel-serial converter connected between said storage means and said second data system, said parallel-serial converter being operated to receive parallel data from said storage means and convert it to serial data;

an output counter operated to receive said second clock signal and said synchronization signal and generate a plurality of counter signals; and an output decoder connected to said output counter, said output decoder operated to generate a plurality of strobe signals in response to predetermined counter signals, whereby said strobe signals operate to cause said multiplexer to gate between said input and stuffed storage locations to form said second data, and to cause said serial data to be transmitted to said second data system.

12. A data rate conversion circuit according to claim 11, said storage means having a defined write cycle time, wherein each of said strobe signals operating to cause said parallel data to be stored into said input storage location and each of said strobe signals operating to cause said serial data corresponding to said parallel data to be transmitted to said second data system are temporally aligned such that each of said strobe signals operating to cause said parallel data to be stored occurs at least a predetermined minimum time interval before each of said strobe signals operating to cause said serial data corresponding to said parallel data to be transmitted, said predetermined minimum time interval related to said defined write cycle time.

13. A data rate conversion circuit according to claim 11, wherein:

said storage means further comprises a plurality of input storage locations;

said input decoder further operates to generate an address signal in response to predetermined input counter signals, said address signal containing the address of one of said plurality of input storage locations into which a channel word of said parallel data is stored; and said output decoder further operates to generate an address signal in response to predetermined output counter signals, said address signal containing the address of one of said plurality of input storage locations from which said multiplexer reads said channel words in forming said second data.

14. A data rate conversion circuit according to claim 13, wherein said input decoder address signals and said output decoder address signals are temporally aligned such that said address signals do not contain the same input storage location address value at the same time.

15. A data rate conversion circuit according to claim 12, said first data pattern further comprising a plurality of spans, each of said spans comprising a separate serial bit stream, and said second data pattern further comprising said plurality of spans, said channel words of said spans interleaved to form a single serial bit stream having a predetermined pattern, wherein said write control means further comprises:

a plurality of serial-parallel converters connected to said first data system, each of said serial-parallel converters being connected to one of said spans and being operated to receive serial data from said spans and convert it to parallel data;

a plurality of latches, each of said latches connected to one of said serial-parallel converters, each of said latches being operated to read channel words from one of said serial-parallel converters;

a multiplexer connected to said storage means, said multiplexer being operated to accept input from said plurality of latches; and said input decoder further operating to generate a plurality of strobe signals in response to predetermined signals from said output counter, said strobe signals being connected to each of said latches and being operated to simultaneously cause each of said latches to read a channel word from one of said serial-parallel converters.

16. A data rate conversion circuit according to claim 13, said first data pattern further comprising a plurality of spans, each of said spans comprising a separate serial bit stream, and said second data pattern further comprising said plurality of spans, said channel words of said spans interleaved to form a single serial bit stream having a predetermined pattern, wherein said write control means further comprises:

a plurality of serial-parallel converters connected to said first data system, each of said serial-parallel converters being connected to one of said spans and being operated to receive serial data from said spans and convert it to parallel data;

a plurality of latches, each of said latches connected to one of said serial-parallel converters, each of said latches being operated to read channel words from one of said serial-parallel converters;

a multiplexer connected to said storage means, said multiplexer being operated to accept input from said plurality of latches; and said input decoder further operating to generate a plurality of strobe signals in response to predetermined signals from said output counter, said strobe signals being connected to each of said latches and being operated to simultaneously cause each of said latches to read a channel word from one of said serial-parallel converters.

* * * * *